ARTICLE ALINING AND FEEDING MECHANISM

INVENTORS
ANTON RICHARD FRANK
BY WILLIAM H. GILES

Luther W. Hawley
ATTORNEY

ARTICLE ALINING AND FEEDING MECHANISM

Filed June 29, 1955 9 Sheets-Sheet 2

INVENTORS
ANTON RICHARD FRANK
BY WILLIAM H. GILES
Luther W. Hawley
ATTORNEY

INVENTORS
ANTON RICHARD FRANK
WILLIAM H. GILES
BY
Luther W. Hawley
ATTORNEY

ARTICLE ALINING AND FEEDING MECHANISM

Filed June 29, 1955 9 Sheets-Sheet 4

INVENTORS
ANTON RICHARD FRANK
BY WILLIAM H. GILES
Luther W. Hawley
ATTORNEY

Aug. 9, 1960 A. R. FRANK ET AL 2,948,394

ARTICLE ALINING AND FEEDING MECHANISM

Filed June 29, 1955 9 Sheets-Sheet 5

INVENTORS
ANTON RICHARD FRANK
BY WILLIAM H. GILES
Luther W. Hawley
ATTORNEY

ARTICLE ALINING AND FEEDING MECHANISM

INVENTORS
ANTON RICHARD FRANK
BY WILLIAM H. GILES
Luther W. Hawley
ATTORNEY

ARTICLE ALINING AND FEEDING MECHANISM

Filed June 29, 1955 9 Sheets-Sheet 7

INVENTORS
ANTON RICHARD FRANK
BY WILLIAM H. GILES
Luther W. Hawley
ATTORNEY

ARTICLE ALINING AND FEEDING MECHANISM

Filed June 29, 1955 9 Sheets-Sheet 8

INVENTORS
ANTON RICHARD FRANK
WILLIAM H. GILES
BY [signature]
ATTORNEY

ARTICLE ALINING AND FEEDING MECHANISM

Filed June 29, 1955 9 Sheets-Sheet 9

INVENTORS
ANTON RICHARD FRANK
WILLIAM H. GILES
BY
Luther W. Hawley
ATTORNEY

United States Patent Office 2,948,394
Patented Aug. 9, 1960

2,948,394

ARTICLE ALINING AND FEEDING MECHANISM

Anton Richard Frank, Jamaica, and William H. Giles, Brooklyn, N.Y., assignors, by mesne assignments, to Van Buren Machine Corp., Brooklyn, N.Y., a corporation of New York Filed June 29, 1955, Ser. No. 518,812

7 Claims. (Cl. 209—97)

This invention relates to a machine for assembling and alining articles for wrapping or stacking.

More particularly stated, the invention relates to a machine adapted to engage, aline and feed a plurality of articles, such as rectangular articles, as, for instance, lumps of sugar. The proper alining of such articles for wrapping machines has previously been done by hand operation, which necessarily slows down the wrapping or stacking operation.

This invention has for its salient object to provide a machine designed to efficiently aline and feed articles and particularly angular or rectangular articles.

Another object of the invention is to provide mechanism for alining and feeding articles so constructed and arranged that broken or undersized pieces will be ejected from the line of feed.

Another object of the invention is to provide mechanism of the character described so constructed and arranged that a plurality of lines of articles will be alined and fed and the lines of articles, one at a time, will feed the articles to a delivery line.

Another object of the invention is to provide mechanism of the character described so designed that it will deliver the articles at such a rate as to supply them to high speed wrapping mechanism.

Further details of the invention will appear from the following specification taken in connection with the drawings which form a part of this application, and in which Fig. 1 is a side elevation of a machine constructed in accordance with the invention;

The invention, briefly described, consists of mechanism designed particularly for alining and feeding articles, such as rectangular articles, to wrapping or stacking mechanism. The articles are first deposited from a hopper on a main feed belt which is generally fed in a direction to advance the articles but is oscillated transversely and also is periodically, momentarily reversed. These various movements of the belt are provided to break up and separate masses of articles which tend to form on the feed belt and retard the feeding and alining movement thereof.

From the main feed belt the articles pass, while still on the main feed belt, between oppositely disposed, movable, alining means, such as belts, these belts being driven in a direction opposite to the direction of feed of the main feed belt. The belts are mounted on a carriage, which in one form of the invention is oscillated laterally.

As an alternative to the alining belts, the articles may be alined by suitable rollers. From the alining mechanism the articles pass between suitable guides onto feed belts and in the form of the invention shown there are a plurality of sets of alining and feeding mechanisms. The feed belts feed the articles forwardly and means is provided during this feeding movement for eliminating broken or undersized articles from the line of feed.

From the individual feed lines the articles are deposited on a delivery belt which will feed the alined articles to suitable wrapping or stacking mechanism. The delivery of the articles from the individual feed lines to the delivery belt is so controlled that only one line will be fed at any one time to the delivery belt, the other lines being stopped from feeding operation.

Further details of the invention will appear from the following description.

*Main feed belt drive and control*

Figures 4, 5:
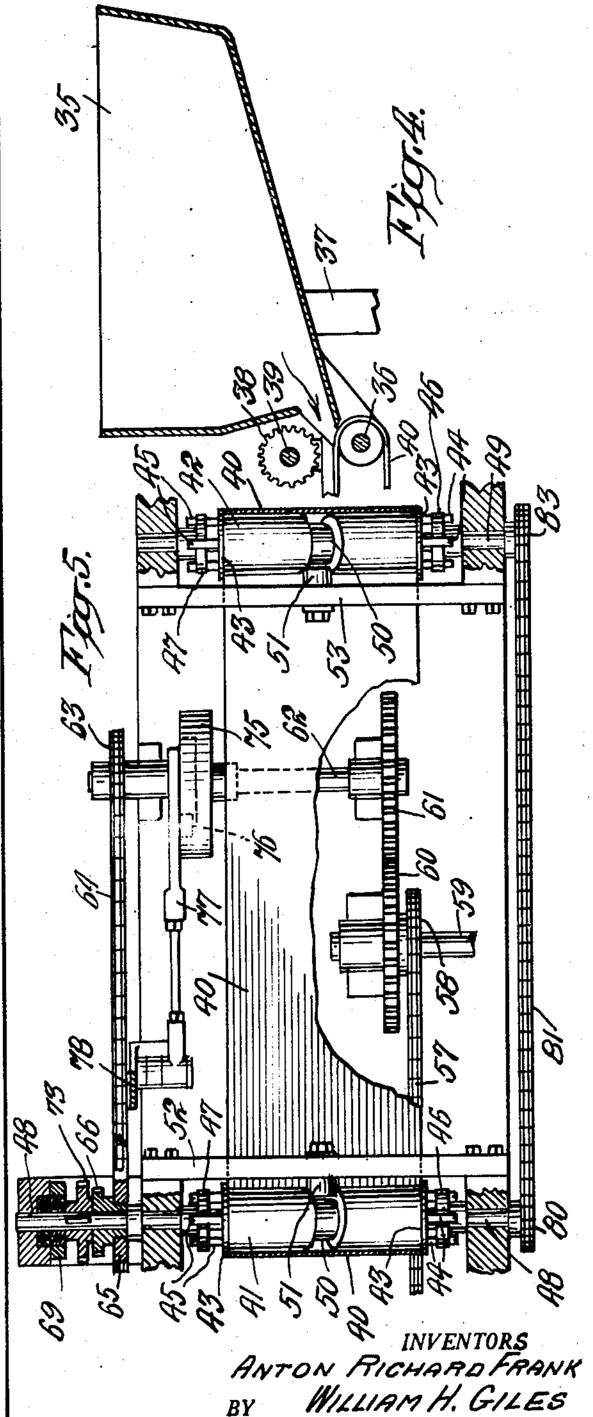
Fig. 4 is a sectional elevation of the hopper.
Fig. 5 is a sectional elevation, partly broken away, showing the mounting and drive for the belt which receives the articles from the hopper.

Attention is directed to Figs. 1 to 9 inclusive. In the form of the invention illustrated in the drawings, the machine is mounted on a base 30 having suitable uprights 31, 32, 33 and 34 for supporting the various parts of the machine. The articles to be alined and fed are deposited in a hopper 35, which is preferably pivoted on a spindle 36, and is vertically vibrated by any suitable vibrating means 37. A roller 38, mounted on a spindle 39, driven in a manner hereinafter described, deposits the articles from the hopper on the main feed belt 40. The belt 40, as shown particularly in Fig. 5, is mounted on rollers 41 and 42 between flanges 43. The rollers 41 and 42 have pins 44 and 45 projecting longitudinally beyond the ends of the rollers and slidably mounted in collars 46 and 47 fixed on the roller shafts 48 and 49.

The rollers 41 and 42 have cam-shaped recesses or slots 50 intermediate their ends and in each slot there is positioned a stud or roller 51, these rollers being mounted on cross bars 52 and 53. Thus, as the rollers rotate, they will be oscillated longitudinally, thus causing the main feed belt 40 to oscillate laterally during its feeding movement.

The driving connections for the feed rollers will now be described, attention being directed particularly to Figs. 1, 2, 5 and 6.

Figure 1:
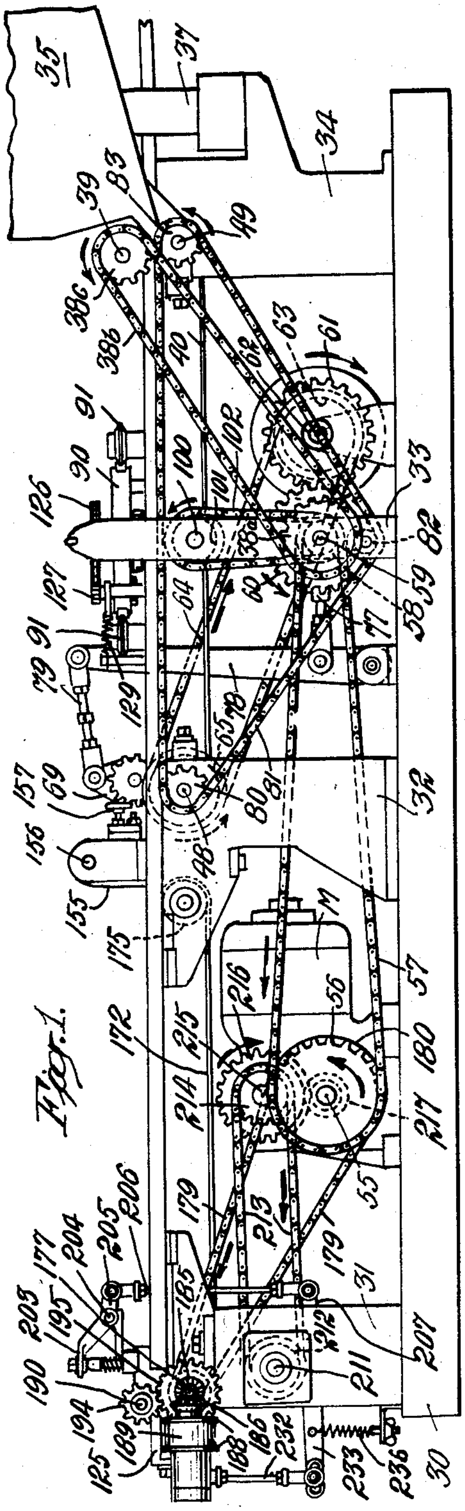
Figure 8:
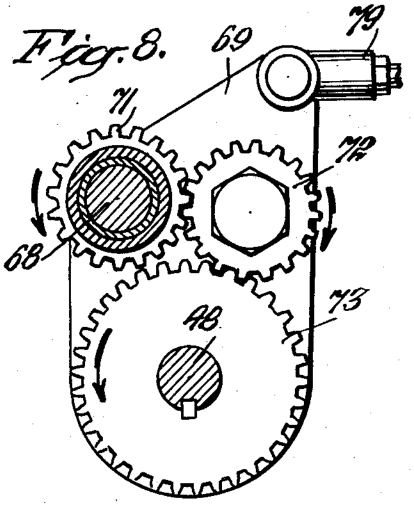
Fig. 8 is a sectional elevation taken substantially on line 8—8 of Fig. 7, looking in the direction of the arrows.

In Fig. 1 there is shown a motor M mounted on a suitable bracket on the base 30. The motor, through a suitable gear box and gearing, drives a shaft 55 on which is mounted a sprocket 56, which drives a chain 57. The chain 57 drives a sprocket 58 mounted on a shaft 59. The shaft 59 has mounted thereon, a sprocket 38A which drives a chain 38B, which in turn drives a sprocket 38C on the shaft 39. The shaft 59 has mounted thereon a gear 60 which meshes with a gear 61 on a shaft 62. Shaft 62 has mounted on the other end thereof a sprocket 63 which drives a chain 64, which drives a sprocket 65 rotatably mounted on the roller shaft 48. Sprocket 65 is secured to a gear 66 which drives a gear 67 rotatably mounted on a stub shaft 68 carried by a bracket or arm 69 which is oscillatably mounted in bearings 70 on the shaft 48. Gear 67 has secured thereto a gear 71 which, as shown in Fig. 8, meshes with a gear 72 mounted on the arm or bracket 69. Gear 72 meshes with a gear 73 which is mounted on and splined to the shaft 48.

The shaft 62 has mounted thereon a cam 75 which is engaged by a roller 76 on a pitman 77. The other end of the pitman is pivoted to a vertically extending arm 78 and the upper end of the arm 78 is connected by a link 79 to the arm or bracket 69.

The drive for the shaft 48 of the roller 41 has been above described and the roller 42 is driven from the shaft 48 by a sprocket 80 which drives a chain 81 which passes around an idler 82 and drives a sprocket 83 on the shaft 49. The chain 81 thus extends around the sprocket 80, idler 82, sprocket 83, and back to the sprocket 80.

In general, the driving connections to the shaft 48 drive the rollers 41 and 42 and belt 40 in a direction to advance the articles. However, by the action of the cam 75, pitman 77, arm 78, and link 79, the bracket or arm 69 is periodically oscillated and during its oscillation causes the gear 72 to roll on the gear 73 and the rate of this movement is such that instead of driving the belt 40 in a direction to advance the articles, the belt is given a momentary reverse movement. This is done for the purpose of breaking up a mass of articles which would tend to collect at the point X shown on Fig. 2 where the articles are about to enter the alining mechanism.

*Article alining mechanisms*

Figure 10:
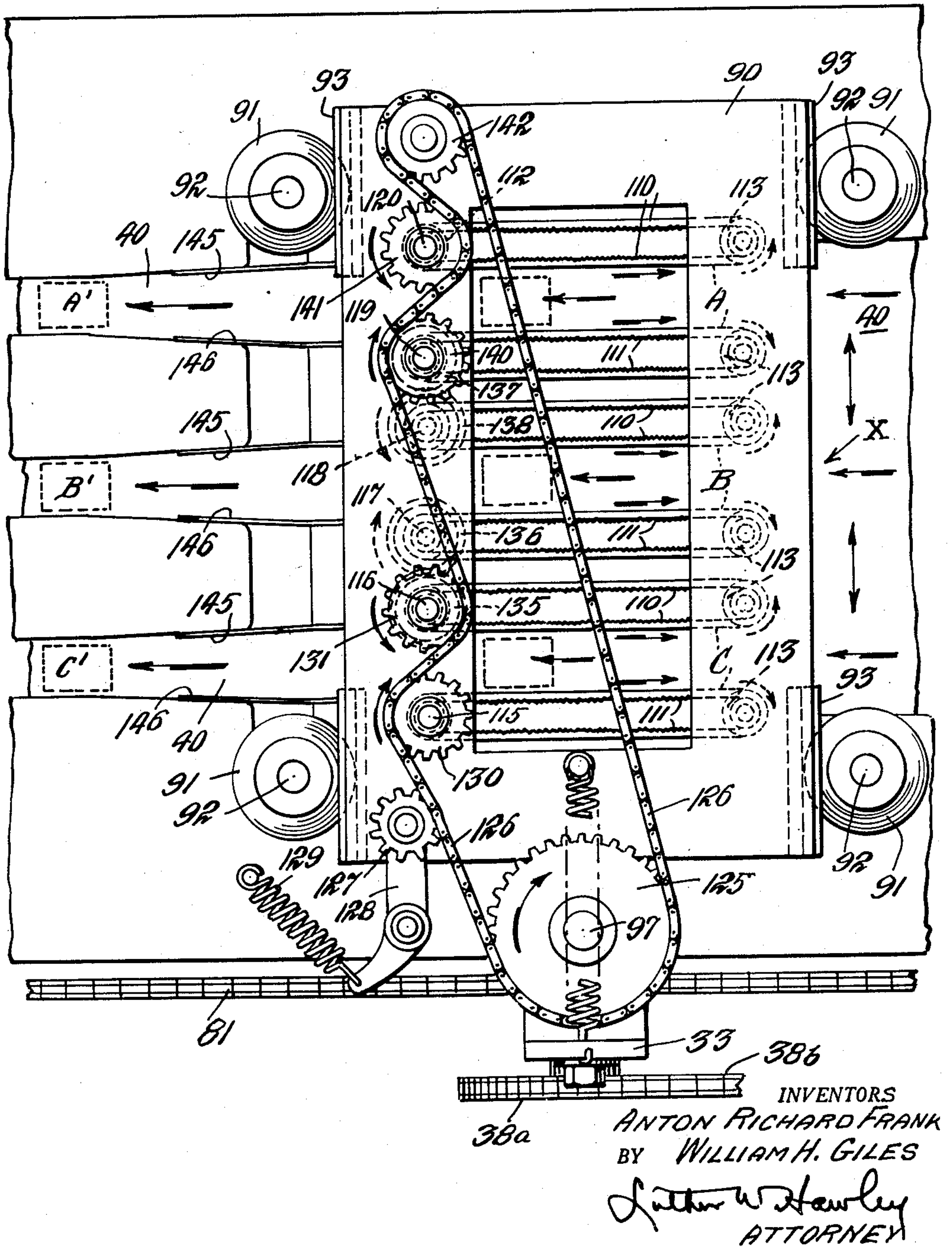
Fig. 10 is a top plan view of the carriage and article alining belts.
Figure 11:
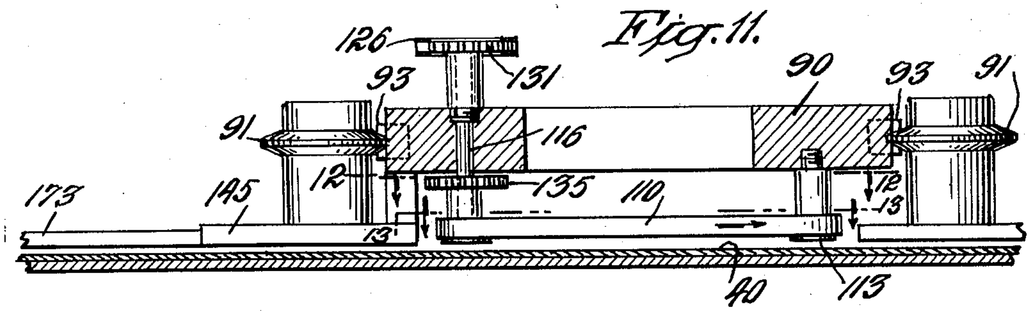
Fig. 11 is a vertical sectional elevation through the carriage showing the mounting thereof and one of the alining belts.

Attention is directed to Figs. 2, 6, and 10 to 16 inclusive. The article alining mechanism, in the form of the invention shown in Figs. 10 to 13 inclusive, is mounted in a carriage 90, which, as shown particularly in Figs. 10 and 11, is slidably supported in V-shaped rollers 91 mounted on spindles 92 and engaging guide blocks 93 having V-shaped notches and secured to the four corners of the carriage 90. The carriage 90 is given a lateral oscillation by means of a cam 95 which engages a roller 96 secured to the under surface of the block. The cam 95 is mounted on a shaft 97 having a bevel gear 98 which meshes with a bevel gear 99 mounted on a shaft 100. Shaft 100 has a sprocket 101 mounted thereon, which is driven by a chain 102, which in turn is driven by a sprocket 103 on the shaft 59. A spring 94 (see Fig. 6) connected to upright 33 and to the carriage 90, holds roller 96 against cam 95.

As shown particularly in Fig. 10, there are a plurality of sets of article alining mechanisms indicated at A, B and C, although it should be understood that as many sets may be used as desired.

Each set of mechanisms consists of a pair of belts 110 and 111 and these belts are driven on their inner laps in a direction opposite to the direction of feed of the main feed belt 40. This is indicated by the arrows in Fig. 10.

Each belt is preferably formed of resilient material if the articles to be fed are fragile, such as lumps of sugar, and each belt is mounted on a pair of pulleys 112 and 113. The pulleys 113 are idlers and the pulleys 112 are driven in a manner about to be described. The pulleys 112 are mounted on vertical spindles or shafts 115, 116, 117, 118, 119 and 120.

The shaft 97 has mounted on the upper end thereof, a sprocket 125 which drives a chain 126. The chain 126 is engaged by an idler sprocket 127 mounted on an arm 128 and the other end of the arm 128 is engaged by a spring 129, the idler 127 thus acting as a chain tightener and providing means for giving or taking up slack.

The chain 126 drives a sprocket 130 mounted on the shaft 115 and a sprocket 131 mounted on the shaft 116. Shaft 116 has mounted thereon a gear 135 which meshes with a gear 136 on shaft 117. Shaft 119 has mounted thereon a gear 137 which meshes with a gear 138 on shaft 118. The chain 126 drives a sprocket 140 mounted on the shaft 119 and a sprocket 141 on the shaft 120. From the sprocket 141 the chain passes around an idler 142 and back to the sprocket 125.

In the foregoing manner the shafts 115 to 120 are all driven and are driven in such a direction that the inner laps 110 and 111 are driven in the direction of the arrows shown in Fig. 10 or in a direction opposite to the general direction of feeding movement of the belt 40. As the articles pass through the alining mechanisms A, B or C, they will be engaged by the belts 110 and 111 if they are out of alinement and will be swung by engagement therewith so that they will be positioned as shown in dotted lines in Fig. 10. The entrance of the articles to the channels between the alining belts is facilitated by the slight lateral oscillation of the main feed belt 40 and also in the form of the invention shown in Figs. 10 to 13 by the slight lateral oscillation of the carriage 90.

As the articles leave the alining mechanism, properly alined, they will pass between guides 145 and 146 into channels designated A′, B′ and C′. It will be understood that the main feed belt 40 extends beneath these channels and is still operating to feed the articles forwardly. After the belt passes around the advance feed roller 41, the articles pass over a bifurcated support or plate 150, through the bifurcation of which extends a roller 151, preferably of resilient material. They then pass over a plate 152, beneath which is mounted a roller 153. If any of the articles is broken or undersize it will drop through the opening indicated at 154 in Fig. 15 and will be engaged by roller 153 and ejected from the feed line.

Figure 14:
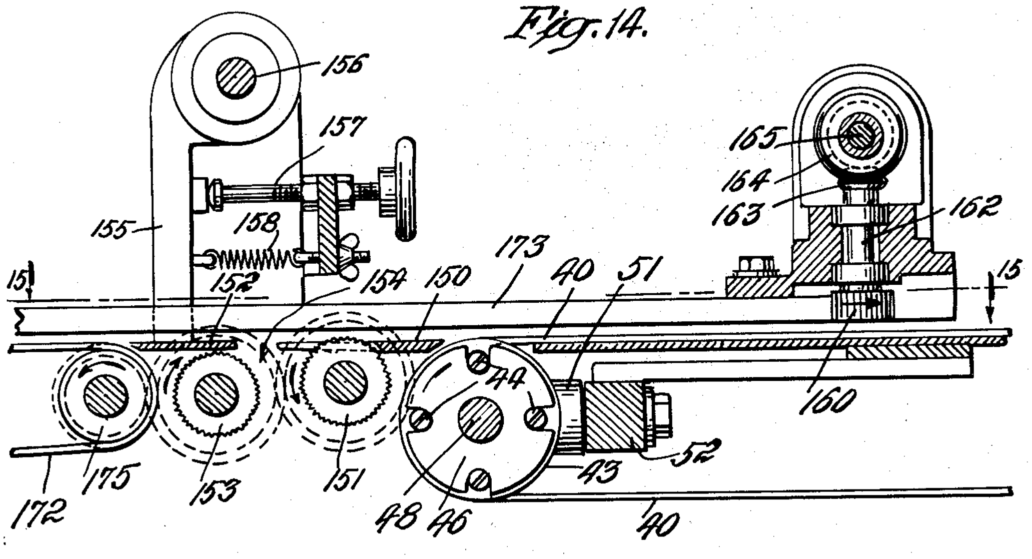
Fig. 14 is a vertical sectional elevation taken through the delivery end of the main feeding belt and showing the feed and article supporting means between the delivery end of the main feeding belt and the individual feed belts which feed the alined articles to a delivery belt, the article alining means shown in this figure being a modification of that shown in Figs. 11 to 13 inclusive.

Means, shown in Fig. 14, is provided for adjusting the plates 152. The plates are mounted on bars 155 pivoted on a shaft 156. Adjustable screws 157 engage the bars 155 and swing the bars on shaft 156 and the bars are held against the screws by springs 158. In this manner the gap 154 can be made wider or narrower.

Figure 15:
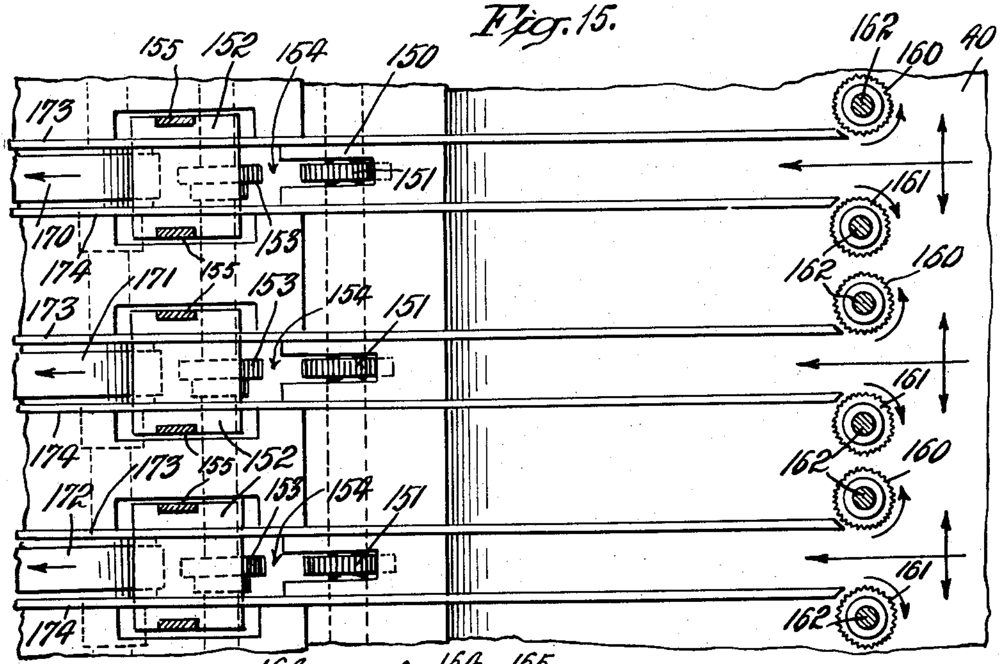
Fig. 15 is a plan view of the structure shown in Fig. 14, this view being taken substantially on line 15—15 of Fig. 14, looking in the direction of the arrows.
Figure 16:
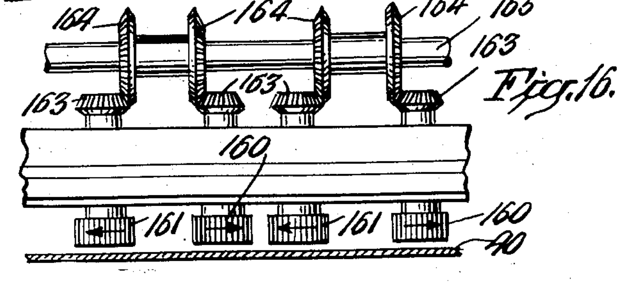
Fig. 16 is an end elevation looking at the right hand end of Fig. 14.

An alternative alining structure is shown in Figs. 14 to 16 inclusive. In these figures the feed belt 40 carries the articles between a plurality of sets of horizontally rotating rollers 160 and 161, these rollers being driven in opposite directions, as shown by the arrows in Fig. 15. The driving connections for the rollers 160 and 161 are shown in Fig. 16. Each roller is mounted on a vertical spindle 162 and on the upper end of each spindle is mounted a bevel gear 163 which meshes with a bevel gear 164 on a shaft 165. Since the driving connections are simple and are clearly illustrated, a further description thereof is not deemed necessary.

*Article feed and control to delivery belt*

Attention is directed particularly to Figs. 1, 2 and 17 to 24 inclusive. As shown particularly in Figs. 2 and 15, the articles, after they pass over the plates 150 and 152, are engaged and fed by belts 170, 171 and 172. These belts feed the articles between vertical guides 173 and 174. The belts 170, 171 and 172 are mounted on pulleys 175 and 176. The pulleys 175 are idlers, but the pulleys 176 are mounted on a shaft 177, on which is mounted a sprocket 178 driven by a chain 179 which engages a sprocket 180 on the shaft 55. Shaft 177 has also mounted thereon a bevel gear 185 which meshes with a bevel gear 186 on a shaft 187 which has mounted thereon a pulley 188 around which the delivery belt 189 passes. The delivery belt is driven in a direction shown by the arrows in Figs. 17 and 18 and takes the articles as they are delivered, selectively, by one of the belts 170, 171 and 172. Selective control means is provided for stopping the feed in two of the feed lines as the articles are being delivered by the third feed line to the delivery belt. This mechanism will now be described.

Above the path of feed of the articles from the belts 170, 171 and 172 there is mounted a shaft 190 having mounted thereon rollers 191, 192 and 193, these rollers preferably being resilient and adapted to engage and feed the articles. The shaft 190 has mounted thereon a gear 194 which meshes with a gear 195 on the shaft 177.

Above each of the lines of feed or each of the belts 170, 171 and 172 there is mounted a vertical, slidable plunger 200 having a resilient pad 201 at its lower end. This plunger is normally held up by a spring 202. The upper end of the plunger is engaged by an arm 203 pivoted at 204 and having a rearwardly extending arm 205. The arm 205 has connected thereto a link 206 and the lower end of the link is connected to an arm 207 mounted on a spindle 208. The other end of the arm 207 carries a roller 209 which engages a cam 210 on a shaft 211. Shaft 211 has a sprocket 212 driven by a chain 213 from a sprocket 214 on a shaft 215. Shaft 215 has a gear 216 which meshes with a gear 217 on the shaft 55. A spring 218 holds the roller 209 against the cam 210.

Figures 2, 3:
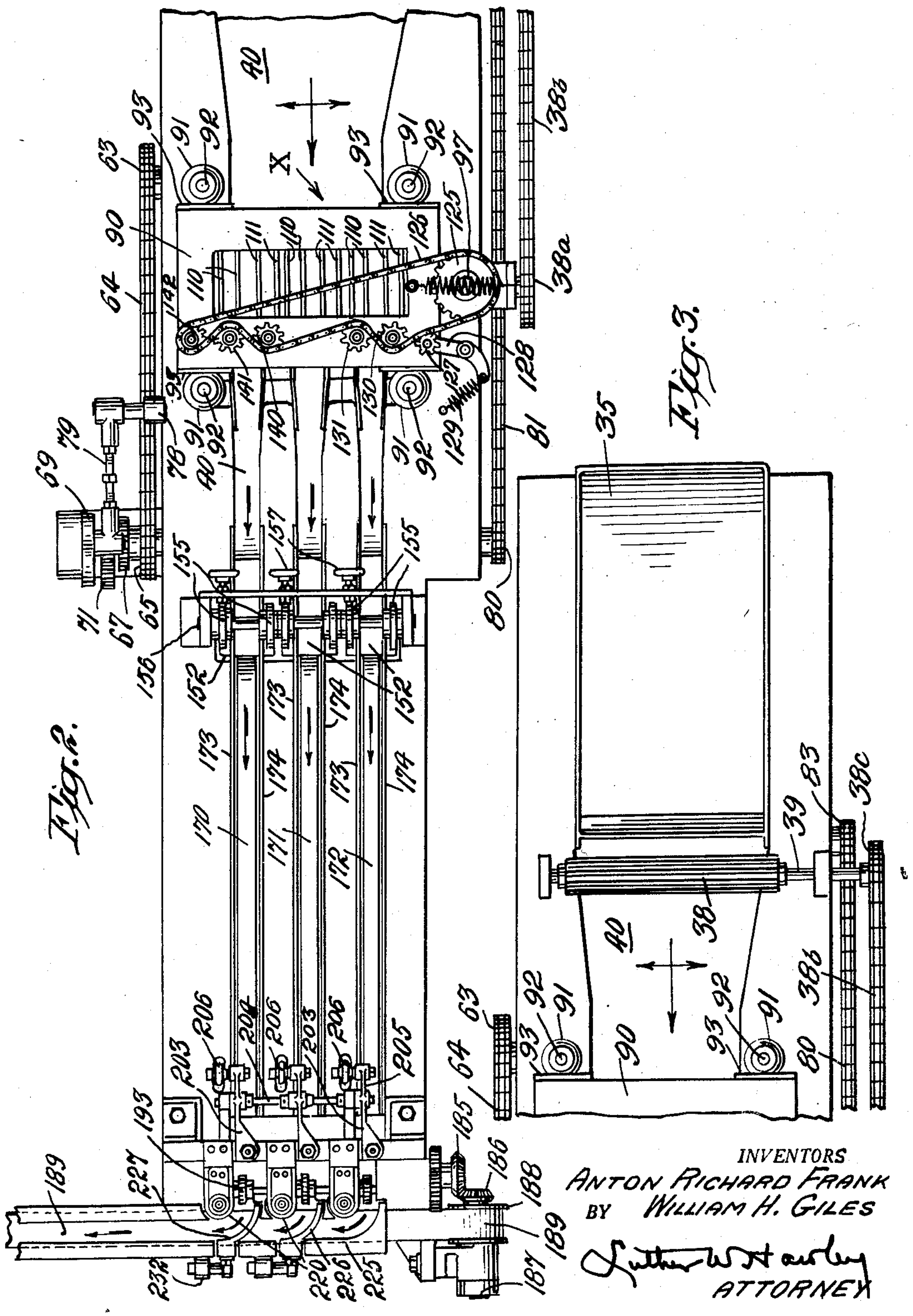
Fig. 2 is a top plan view of the machine shown in Fig. 1.
Fig. 3 is a plan view of the hopper and receiving end of the machine shown in Figs. 1 and 2.
Figure 6:
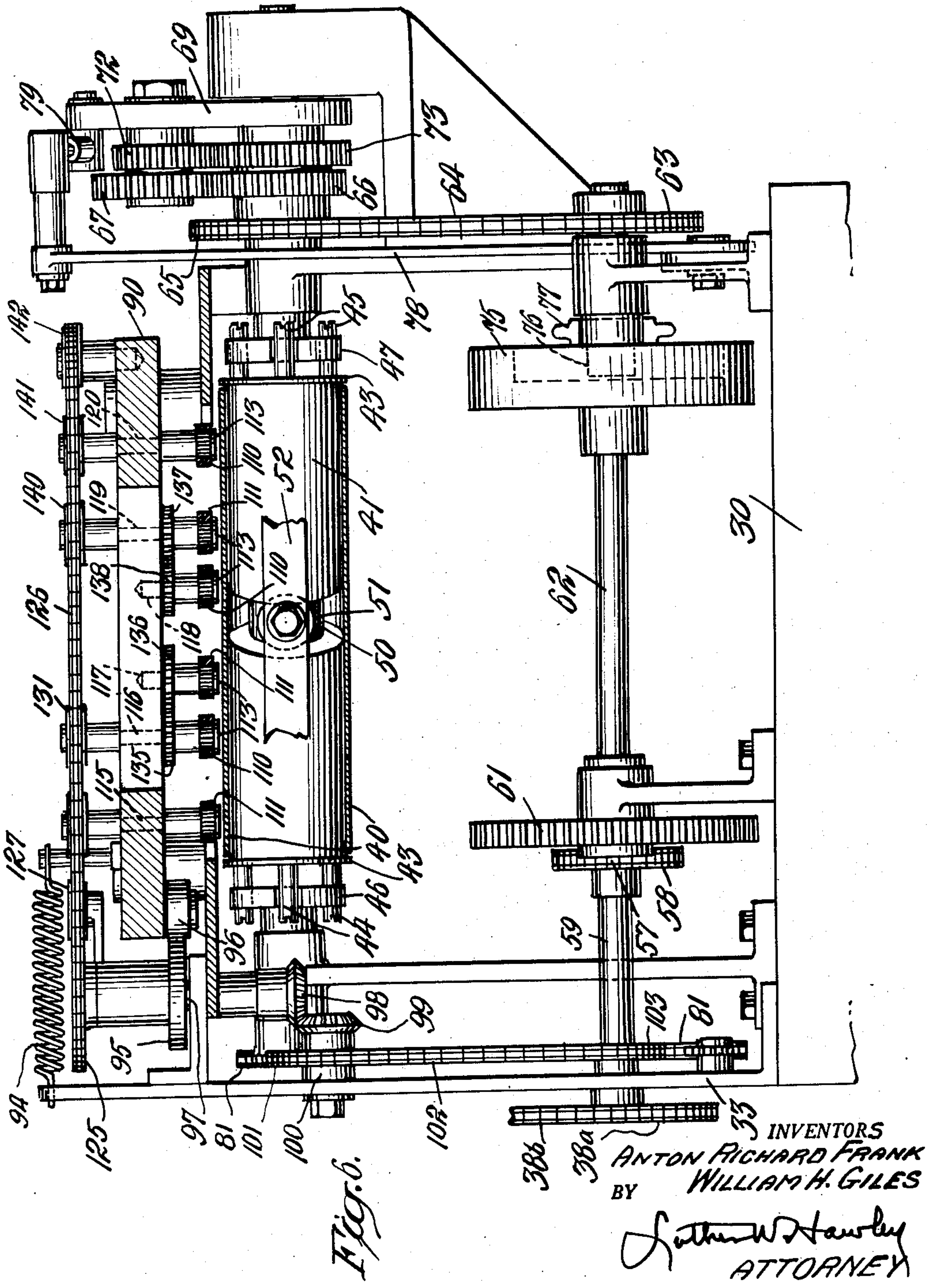
Fig. 6 is a vertical sectional elevation showing one of the belt supporting rollers and the driving connections therefor, and also showing the carriage and alining and feeding belts carried thereby which receive the articles from the initial feeding belt.
Figure 7:
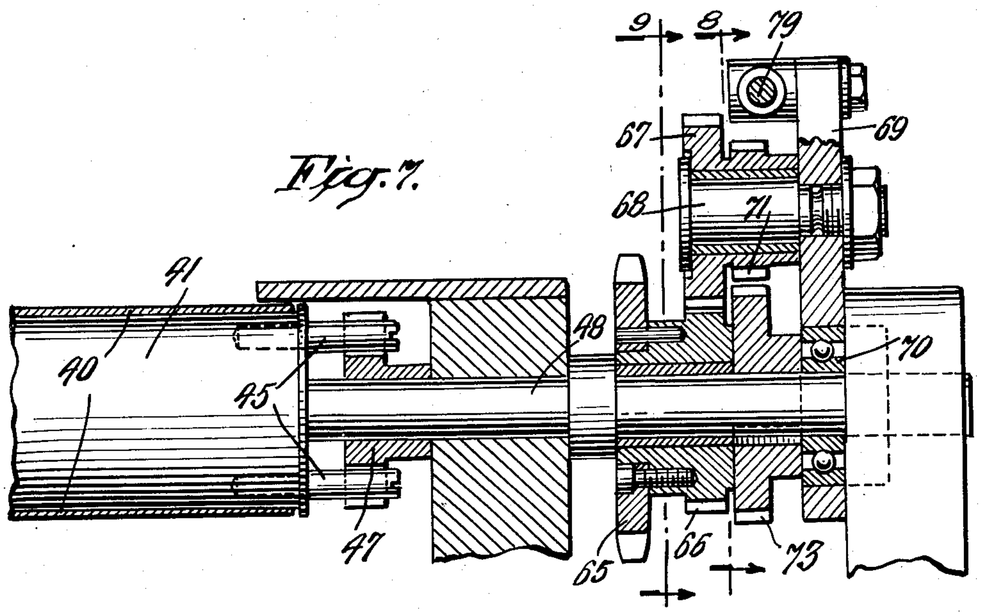
Fig. 7 is a sectional elevation through the driving mechanism for the main belt which receives the material from the hopper.
Figure 9:
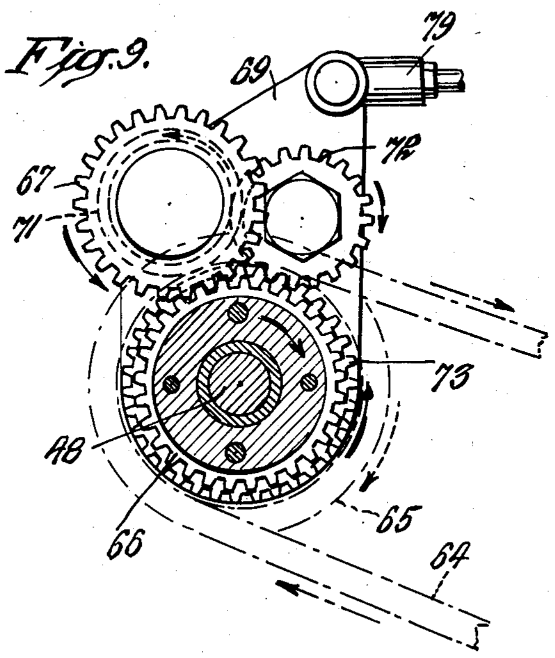
Fig. 9 is a sectional elevation taken substantially on line 9—9 of Fig. 7, looking in the direction of the arrows.
Figures 12, 13, 21, 22, 23, 24:
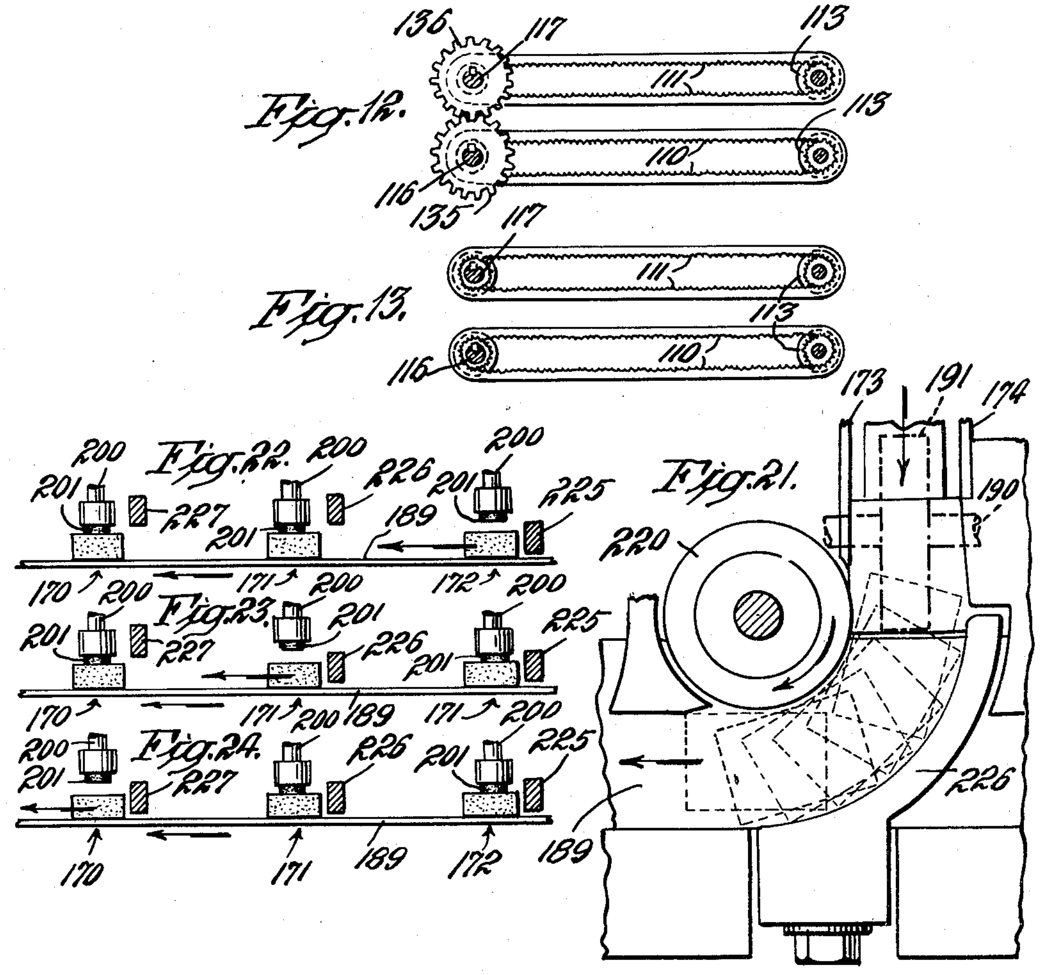
Fig. 12 is a sectional elevation taken substantially on line 12—12 of Fig. 11, looking in the direction of the arrows.
Fig. 13 is a sectional elevation taken substantially on line 13—13 of Fig. 11, looking in the direction of the arrows.
Fig. 21 is a fragmentary plan view showing the delivery end of one of the individual feed lines and the guiding and feeding means for feeding the articles to the delivery belt.
Figs. 22, 23 and 24 are diagrammatic views showing the positions of the feed stopping mechanism and article guiding mechanism whereby articles are feed from one line only to the delivery belt at any one time.
Figures 17, 18:
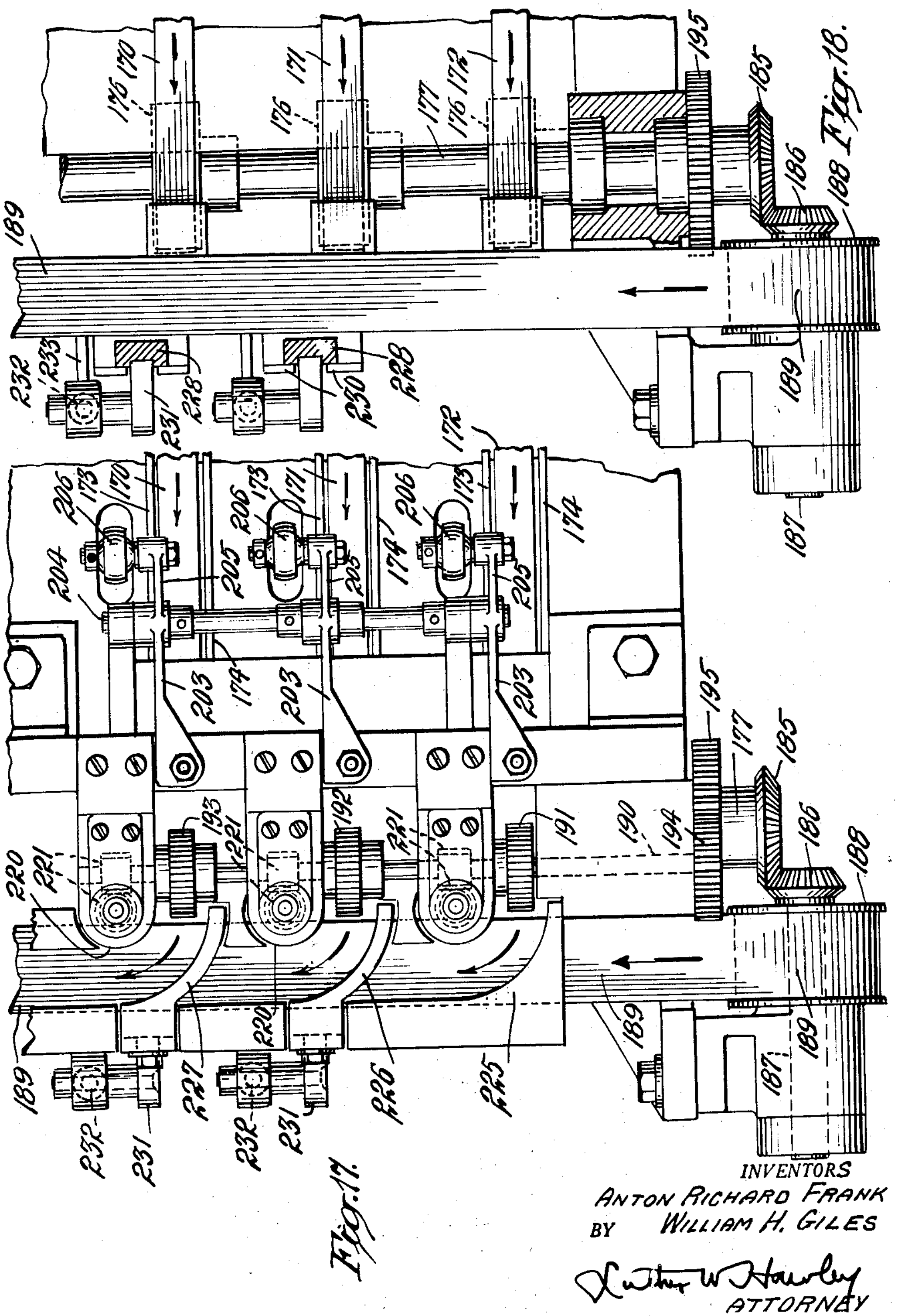
Fig. 17 is a plan view of the delivery end of the individual feed belts and the delivery belt which receives the articles therefrom.
Fig. 18 is a plan view, partly in section, of the delivery end of the individual feed belts and parts adjacent thereto.

It will be understood from the illustration in Figs. 2 and 17 that a plunger 200 is provided for each line of feed and a cam and control lever and connecting link to an arm 203, 205 are also provided. These cams are so designed that the plunger for the three lines of feed will be operated in the manner shown in Figs. 22, 23 and 24. In Fig. 22 the line of feed in the two left hand lines is stopped since the plungers are depressed. The right hand line of feed is open. In Fig. 23 the two outside lines are stopped and the intermediate line is open. In Fig. 24 the left hand line is open and the other two lines are closed.

In order to assist in feeding the articles around the right angle turn, as shown particularly in Fig. 21, a horizontally operating feed roller 220 is provided for each line of articles and this feed roller is driven by a worm driving connection shown at 221 in Fig. 17.

Figure 19:
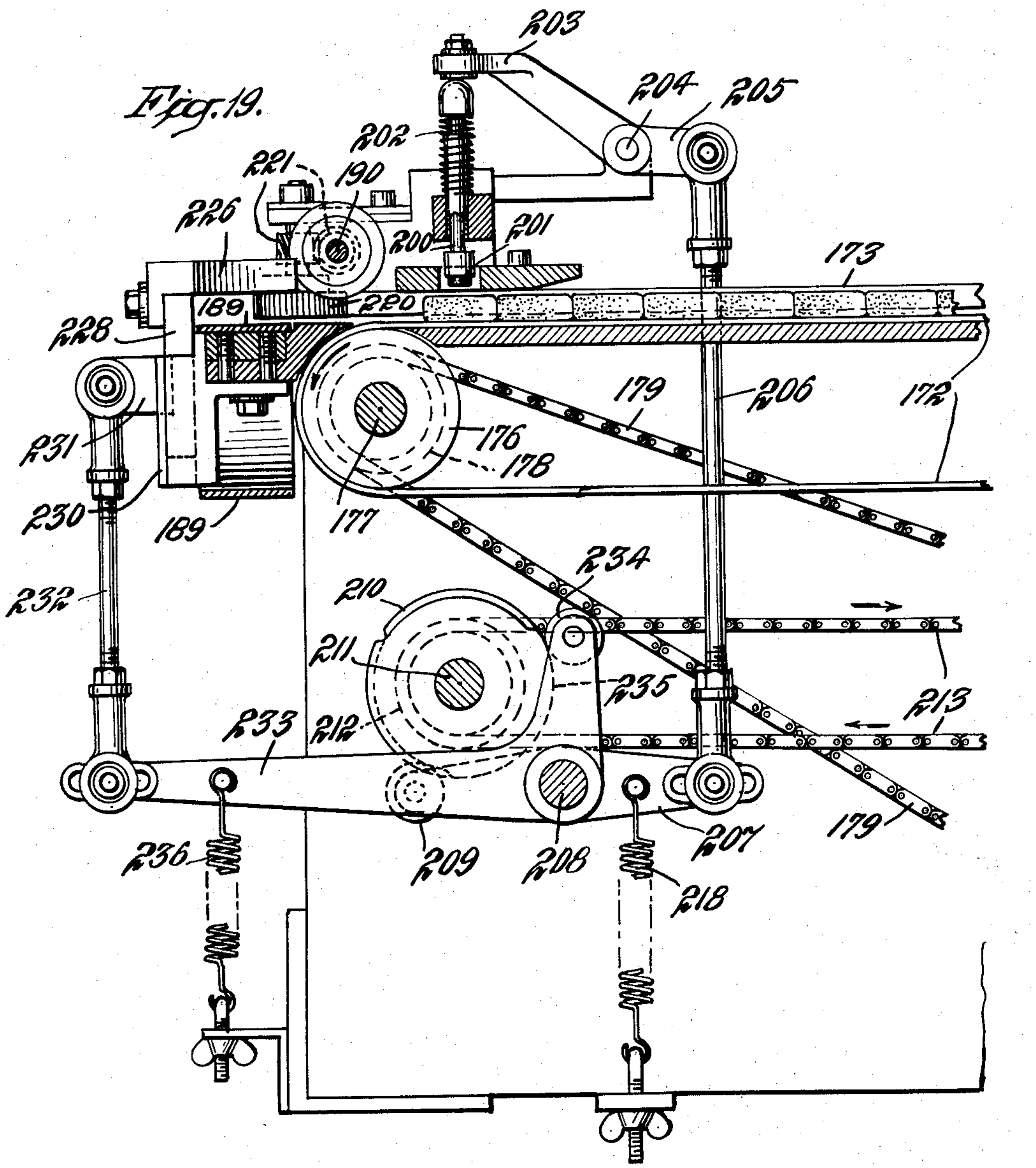
Fig. 19 is a vertical sectional elevation of the structure shown in Fig. 18, showing the operation of the feed interruption mechanism and the guiding mechanism for guiding the articles to the delivery belt.
Figure 20:
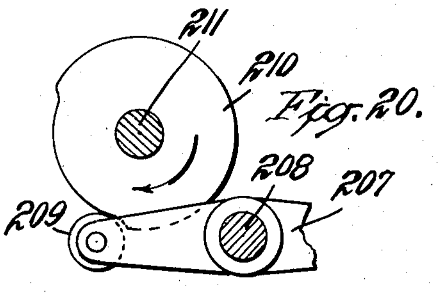
Fig. 20 is a fragmentary sectional elevation showing the cam and operating means for the feed stopping mechanism.

Further means is provided for guiding the articles from the belts 170, 171 and 172 around the right angle turn onto the delivery belt 189, and attention is particularly directed to Figs. 2, 17 and 19. As shown in Fig. 17, a guide member for the line 172 is fixedly mounted, as shown at 225. Guide members 226 and 227 are also provided for the lines of feed 171 and 170, but in order not to interfere with the travel of the articles from line 172 on the delivery belt 189, the guide members 226 and 227 are mounted for vertical movement out of the path of travel of the articles. This movement will now be described and attention is again directed to Figs. 17, 18 and 19.

In Fig. 19 there is shown a guide member which may be either member 226 or 227, but for convenience will be designated 226. This guide member is carried by a block 228 which is slidable in guideways 230, as shown in Fig. 18. The block has connected thereto an arm 231, to which is connected a link 232 which is pivoted at its lower end to an arm 233 pivoted on the spindle 208. The lever arm 233 extends beyond the pivot 208 at right angles thereto and carries a roller 234 which engages a cam 235 mounted on the shaft 211. A spring 236 is connected to the arm 233 and holds the roller against the cam 235.

The operations of the lever arms and cams which control the guide members 226 and 227 are shown in Figs. 22, 23 and 24. In Fig. 22 the right hand line of feed, or line 172, is open, and the articles are being fed in the manner shown in Fig. 21 to the delivery belt 189. The guide members 226 and 227 are shown in raised position. In Fig. 23 the intermediate line 171 is delivering articles and the guide member 227 is raised and member 226 is in operative position.

In Fig. 24 the left hand line, viewing Fig. 4, or line 170, is delivering articles, and the guide member 227 is in operative position.

From the foregoing specification it will be seen that the articles will be deposited on the main feed belt 40 and will be agitated thereon by lateral and reverse movements of the belt in opposition to the direction of feed so that they pass between or through the channels in which they are straightened and alined and fed forwardly. Thereafter the articles pass over the spaced supporting plates so designed that broken or undersized articles will be eliminated from the line of feed. The articles then, in alined position, pass through the individual feed channels to the discharge ends thereof, from which they are discharged onto the delivery belt. Means hereinbefore described is provided for controlling the discharge of the articles from the individual channels so that they will be discharged from one channel at a time.

Although certain specific embodiments of the invention have been particularly shown and described it will be understood that the invention is capable of modification and that changes in the construction and in the arrangement of the various cooperating parts may be made without departing from the spirit or scope of the invention, as expressed in the following claims.

What we claim is:

1. In a mechanism for alining and feeding articles, a feed belt, operating means for said belt arranged to move said belt generally in a direction to advance the articles, said operating means having mechanism incorporated therein for periodically and momentarily reversing said belt movement, means superposed on said belt defining channels for alining and for the movement of said articles, said channel forming means comprising a plurality of sets of belts, each set comprising two belts spaced apart to form a channel, means for operating said spaced belts so that the inner laps will move in a direction opposite to the general direction of feed of said feed belt, and means for oscillating said channel forming belts laterally during the operation thereof.

2. In a mechanism for alining and feeding articles, a feed belt, operating means for said belt arranged to move said belt generally in a direction to advance the articles, said operating means having mechanism incorporated therein for periodically and momentarily reversing said belt movement, means superposed on said belt defining channels for alining and for the movement of said articles, said channel forming means being movable longitudinally relative to said feed belt, means for moving said channel forming means in a direction opposite to the general feeding movement of the feed belt to aline the articles fed, and means for oscillating said superposed channel forming means transversely of the direction of feeding movement of the feed belt.

3. In a mechanism for alining and feeding articles, a feed belt, operating means for said belt arranged to move said belt generally in a direction to advance the articles, means superposed on said belt defining channels for alining and for the movement of said articles, said channel forming means comprising a plurality of sets of belts, each set comprising two belts spaced apart to form a channel, means for operating said spaced belts so that the inner laps will move in a direction opposite to the general direction of feed of said feed belt, and means for oscillating said channel forming belts laterally during the operation thereof.

4. In a mechanism for alining and feeding articles, a feed belt, operating means for said belt arranged to move said belt generally in a direction to advance the articles, said operating means having mechanism incorporated therein for periodically and momentarily reversing said belt movement, and means for oscillating said feed belt laterally during its feeding movement.

5. Mechanism for alining and feeding objects, comprising a main feed belt, means for driving said belt in a direction to advance the objects, means operatable to periodically and momentarily reverse the belt movement, a plurality of channels above the belt, means for straightening and alining objects as they pass through the channels, an individual feed belt alined with each channel, a delivery belt operating at an angle to said plurality of individual feed belts and adapted to receive objects therefrom, selective means at the delivery ends of said individual feed belts for interrupting delivery from all but one of said plurality of individual feed belts at one time, means superposed on the delivery belt for guiding articles fed thereon by the individual belts, and means for raising the guiding means operating in conjunction with the individual belts which are interrupted in their feeding operation.

6. In a mechanism for alining and feeding articles, a main feed belt for advancing the articles, means mounted above the belt forming channels through which the articles are fed by the feed belt, said means engaging, straightening and alining the articles, article feeding means mounted in advance of said main feed belt in the direction of the line of feed of the articles for receiving and feeding the articles received from the main feed belt and means disposed intermediate the main feed belt and the article feeding means for ejecting from the line of feed articles which are under size.

7. In a mechanism for alining and feeding articles, a main feed belt for advancing the articles, means for oscillating said main feed belt laterally during the feeding operation thereof, means above said belt forming channels through which the articles are fed by the feed belt, said means engaging, straightening and alining the articles, article feeding means mounted in advance of said main feed belt in the direction of the line of feed of the articles for receiving and feeding the articles received from the main feed belt and means disposed intermediate the main feed belt and the article feeding means for ejecting from the line of feed articles which are under size.

References Cited in the file of this patent

UNITED STATES PATENTS

| | | |
|---|---|---|
| Re. 20,675 | Todd | Mar. 22, 1938 |
| 1,158,120 | Conte | Oct. 26, 1915 |
| 1,369,377 | Benson | Feb. 22, 1921 |
| 1,990,549 | Kimball | Feb. 12, 1935 |
| 2,301,543 | Hlavaty | Nov. 10, 1942 |
| 2,576,369 | Sticelber | Nov. 27, 1951 |
| 2,587,959 | Biner | Mar. 4, 1952 |
| 2,649,951 | Sandberg | Aug. 25, 1953 |
| 2,682,331 | Campbell | June 29, 1954 |
| 2,685,358 | Heil et al. | Aug. 3, 1954 |
| 2,744,611 | Jenney et al. | May 8, 1956 |
| 2,791,315 | Chapman | May 7, 1957 |
| 2,810,480 | Carroll | Oct. 22, 1957 |

FOREIGN PATENTS

| | | |
|---|---|---|
| 739,385 | Great Britain | Oct. 26, 1955 |